United States Patent [19]

Dalan et al.

[11] 3,922,375
[45] Nov. 25, 1975

[54] PREPARATION OF A SOLUBLE WHEY PROTEIN FRACTION

[75] Inventors: Ernesto Dalan, Vevey; Michel John Arthur Groux, La Tour-de-Peilz; Jaime Hidalgo, La Tour-de-Peilz, all of Switzerland

[73] Assignee: Societe d'Assistance Technique pour Produits Nestle S.A., Lausanne, Switzerland

[22] Filed: July 18, 1973

[21] Appl. No.: 380,365

[30] Foreign Application Priority Data

Sept. 11, 1972 Sweden............................ 13272/72

[52] U.S. Cl. ................ 426/583; 426/491; 426/590; 426/656
[51] Int. Cl.² ........................................... A23J 1/20
[58] Field of Search ........... 426/364, 491, 187, 583, 426/590, 656; 260/112, 122

[56] References Cited
UNITED STATES PATENTS 2,606,181  8/1952  Pratt et al. .......................... 260/122
3,642,493  2/1972  Arndt............................. 426/364 X

OTHER PUBLICATIONS

Fenton–May, et al., Use of Ultrafiltration or Reverse Osmosis Systems for the Concentration and Fractionating of Whey, Journal of Food Science, Vol. 36, 1971 (pp. 14–21).

*Primary Examiner*—David M. Naff
*Attorney, Agent, or Firm*—Watson Leavenworth Kelton & Taggart

[57] ABSTRACT

A soluble whey protein fraction is prepared by a process which comprises adjusting the pH of an aqueous solution containing proteins isolated from whey which are substantially undenatured by heat to a value of 4.4 to 5.0 to form a precipitate, removing the precipitate, separating lipid/protein complexes from the solution and recovering the filtrate containing a soluble whey protein fraction in solution. The fraction is particularly suitable for incorporation in beverages both for protein-enrichment purposes and as a constituent of a clouding agent.

10 Claims, No Drawings

PREPARATION OF A SOLUBLE WHEY PROTEIN FRACTION

The present invention is concerned with the preparation of a soluble fraction of whey protein.

Whey, which is a by-product of the cheese-making industry available in substantial quantities, contains various nutritive substances, in particular proteins such as $\alpha$-lactalbumin and $\beta$-lactogobulin. Recovery of these nutritive substances, in particular of proteins, has stimulated considerable research and different methods of isolation of these proteins have been suggested. Among these techniques it is appropriate to mention those which do not cause significant heat denaturation of the proteins, and these may be combined in 3 main categories:

Treatment of whey by ultrafiltration, providing two fractions of differing chemical compositions. One fraction, designated "ultrafiltrate" or "permeate" consists essentially of an aqueous solution containing low molecular weight substances such as lactose and the mineral salts of whey. The other fraction, which has not passed through the semi-permeable membrane (concentrate or retentate) is an aqueous solution having an increased protein content. This concentrate may be subjected to further ultrafiltration operations, under appropriate conditions, optionally after redilution, and then be dried to provide a protein concentrate or isolate.

Separation of whey into two fractions by filtration on a molecular sieve. In this technique the molecular sieve, generally consisting of a gell such as a cross-linked polyacrylamide, selectively regulates the elution rate of molecules according to their dimensions. As a result, by filtration on a molecular sieve the constituents of whey are separated according to their molecular weights, so that a protein-rich effluent fraction, and a fraction containing lactose and mineral salts, may be recovered. This technique may be combined with ultrafiltration. the resulting fraction may be dried to provide a whey protein concentrate.

Separation of proteins by precipitation and recovery of the precipitate. The precipitation is generally effected by forming an insoluble complex between the proteins and some other substance, for example a polymetraphosphate. The complex is subsequently dissociated to release the proteins.

However, products obtained by these processes do not generally provide clear aqueous solutions and hence may not satisfactorily be used as additive in the preparation of protein-enriched beverages, especially if these latter are of acidic pH. Moreover, the products frequently possess an off-flavour which restricts their use as food ingredients.

An object of the present invention is to provide a process for the preparation of a soluble whey protein fraction which provides clear aqueous solutions in a very broad range of pH values, and which is exempt from the characteristic odour and flavour of whey protein isolates.

The process according to the invention comprises adjusting the pH of an aqueous solution containing proteins isolated from whey which are substantially undenatured by heat to a value of 4.4 to 5.0 to form a precipitate, removing the precipitate, separating lipid/protein complexes from the solution by microfiltration and recovering the filtrate containing a soluble protein fraction in solution.

Microfiltration is intended to designate physical separation from suspension of particles of the order of 1 micron in size or less.

The solution used as starting material in the process according to the invention may be a whey fraction obtained by ultrafiltration (concentrate) or by molecular sieve filtration (1st elution fraction) or by a combination of these techniques, the dry matter present in this solution having a protein content preferably exceeding 40% by weight. This starting material may also be an aqueous solution prepared by dispersing in water a protein concentrate or isolate obtained from whey by a procedure not involving heating to a temperature above that at which heat denaturation commences. Such a concentrate, which may be prepared by any one of the methods previously described, generally contains 40 to 80% by weight of protein.

Although it is highly desirable that the starting solution contains substantially no heat-degraded proteins, as these would necessarily eliminated during the process, a starting solution containing proteins of which a part has been heat-denatured may be used, for example a solution of proteins isolated from whey which had been pasteurised or sterilised, but in this case larger amounts of precipitate are formed and a proportion of the proteins orginally present is lost.

The solution used as starting material preferably has a solids content not exceeding 25 to 30% by weight, as at higher contents it becomes viscous and less easy to handle. It is particularly advantageous to use a solution containing 2 to 3% by weight of dry matter.

Adjustment of the pH of the solution between 4.4 to 5.0, preferably a value of the order of 4.5 to 4.6, may be effected with an edible acid such as, for example, orthophosphoric, citric or hydrochloric acid. This acidification is preferably carried out progressively, and with stirring, for example during 30 to 45 minutes until the desired pH is reached. This progressive acidification method avoids the formation, within the body of the solution, of localised zones the pH of which is below the desired value.

The resulting precipitate, containing residual casein, denatured fractions of whey protein, as well as lipid/protein complexes, is then separated from the solution by centrifugation, filtration or decantation. The solution is preferably allowed to stand before removing the precipitate, for example for 2 to 4 hours, in order to permit the particles of insoluble substances to collect together, thus facilitating separation fo the precipitate.

The temperature of the solution, which should desirably not exceed that at which denaturation of the dissolved proteins commences (which is of the order of 65° to 70°C), is by ne means of critical importance as regards the formation of the precipitate. It is however preferred to warm the solution to about 40°C, after formation of the precipitate, in order to facilitate the subssequent separation step.

The recovered solution is somewhat turbid, on account of the presence of fine particles of lipid/protein complexes which were not removed with the precipitate formed by adjustment of th pH. These particles are then removed by microfiltraton. Trials made with calibrated filters have shown that the filtration threshold at which clear solutions may be obtained is of the order of one micron, and it may vary slightly depending on the technique used for preparing the starting protein solution. Thus, for a aqueous solution prepared by ultrafiltration of whey followed by filtration on a molecular sieve and treated as described previously, the desired degree of clarification may be obtained with a filter retaining 98% particles of average diameter of 1 micron. It is on the other hand preferable, if the starting solution was prepared by dispersing a protein concentrate in water, to use a filter which retains finer particles (average diameter of the order of 0.5 micron). Industrial application of this filtration may for example be effected with sterilisation filters, the filter element of which may for example be of glass fibres, or with filtering devices comprising superimposed layers of inert filter materials such as cellulose, asbestos or cotton. Filter aids such as celite may also be used, and it is generally preferred, in order to prevent rapid compaction of very fine filters, to carry out a prefiltration and/or centrifugation of the solution.

The clear solution obtained after microfiltration contains a whey protein fraction soluble in aqueous media at any pH (even if this pH corresponds to the isoelectric pH of lactalbumin giving clear solutions). The protein solution may then be concentrated, for example by evaporation under reduced pressure, and dried, as by spray-drying. The resulting product is a powder exempt from the characteristic flavour and odour of whey protein concentrates.

A sterilised product may also be prepared; however, as the isoelectric point of lactalbumin corresponds to a pH of about 5.0, preliminary acidification of the solution to a pH equal to or below 3.4 is desirable before sterilisation, to avoid coagulation of the protein at the sterilisation temperature. The solution may then be sterilised, for example by heating at 121°C for 3 to 4 minutes, or by a UHT (Ultrahigh temperature) or HTST (High temperature/short time) process. After sterilisation the solution may be concentrated and dried. The dried product is completely soluble in water at pH values below 3.4 or above 6.5, and on dispersion in water forms clear solutions.

The protein product obtained by the process according to the invention may be incorporated in edible compositions as well as in beverages, and also in compositions adapted to provide beverages on dispersion in water, particularly acidified beverages which may also be carbonated.

A particularly advantageous application of the product obtained by the process according to the invention is as an ingredientn of a clouding agent for beverages or beverage compositions. By "clouding agent" is meant a product adapted to give aqueous solutions the turbid aspect of certain natural suspensions such as fruit juices or milk. Such an agent may be composed of a number of particles of fat coated with a substance such as a water-soluble edible gum. It is generally prepared by emulsifying an edible fat in an aqueous solution of an edible gum. The emulsion is then spray-dried to give a powder which, on dispersion in water, gives the desired cloudy aspect. Such a clouding agent however is practically unusable in the preparation of an acidified protein-enriched beverage as it contains polysaccharides which react with proteins to form insoluble complexes which precipitate and give rise to undesirable sediments.

However, if the clouding agent is prepared using the product obtained by the process according to the invention as a coating material for the fat particles, the agent may be incorporated in beverages of very different types, including beverages which are carbonated, and/or contain added protein.

The clouding agent may be prepared by emulsifying an edible fat in an aqueous solution of the soluble whey protein fraction and spray-drying the emulsion, preferably after homogenisation. The resulting product is in the form of a powder which is easily dispersible in water or in aqueous solutions, giving suspensions with a milky appearance even at relatively low pH values, for example of the order of 2.5. This clouding agent may advantageously be incorporated in powdered beverage compositions, for example in simulated fruit juice compositions. The whey protein fraction may be included in beverages or beverage compositions as an ingredient of the clouding agent and also as an additive to increase the protein content of the beverage.

The invention is illustrated by following examples in which the percentages are expressed on a weight basis.

EXAMPLE 1

75 kg of whey protein isolate, containing about 80% of protein (on dry matter), are dispersed in 3000 litres of water. The isolate is obtained by ultrafiltration of whey, gel filtration of the ultrafiltration concentrate, concentration and drying. An aqueous suspension having a pH of 6.5 is thus obtained.

The pH of the suspension is then progressively adjusted to 4.5 with citric acid, with moderate stirring, so as to reach the desired pH within 40 minutes. A precipitate forms and the suspension is allowed to stand for 4 hours. It is then heated to 40°C and passed through a decreaming centrifuge to remove heavy particles.

The solution is centrifuged a second time at high speed, and the supernatant is first filtered on a Komet-Theorit No. 5 filter (produced by Seitz Company, Germany) and then a second time on an E.K.S. sterilization filter (produced by Seitz Company, Germany), giving a completely clear filtrate having a slight greenish colour.

The substances retained in the second filtration have the characteristic odour of whey protein isolates. Chemical analysis of a sample of these substances shows that they are essentially composed of lipid/-protein complexes containing about 65% of proteins and 35% lipids, the lipid fraction including about 95% of phospholipids and 5% unsaponifiable substances (hydrocarbons, sterols and long-chain alcohols representing respectively 11%, 66% and 22% of the unsaponifiable substances).

The solution collected after microfiltration is concentrated by evaporation under reduced pressure to a dry matter content of 12% and is then spray-dried. 60 kg of a powdered product are thus obtained, containing 75% of proteins. The product has a neutral odour and taste, is soluble in water at any pH, and is particularly suitable for incorporation in beverages or beverage compositions.

EXAMPLE 2

3000 litres of a clear solution containing 2.5% of a whey protein fraction are prepared as described in Example 1. The solution recovered after filtration is acidified to pH 2.9 with orthophosphoric acid, then sterilised for 4 seconds at 150°C by a UHT process and cooled very quickly under reduced pressure to 45°C. This solution is then concentrated by vacuum evaporation and dried as described in Example 1.

65 kg of a sterilised powdered product are thus obtained. The product has a neutral odour and taste, and is soluble in water at pH values below 3.4 or above 6.5.

EXAMPLE 3

20 kg of a protein isolate containing 50% protein on dry matter, prepared from whey by gel filtration, are dissolved in 1000 litres of water. The pH of the aqueous solution is then adjusted to 4.5 with citric acid and it is allowed to stand for 4 hours. The solution is then heated to 40°C and the precipitate is removed as described in Example 1. The solution is then acidified to pH 3.0 with orthophosphoric acid and filtered as described in Example 1. The filtered solution is sterilised, concentrated and dried as described in Example 2.

16 kg of a product containing 70% of protein are obtained, having the same properties as the product of Example 2.

EXAMPLE 4

1000 litres of cheese whey containing 0.5% of protein are treated by ultrafiltration, to provide 170 litres of ultrafiltration concentrate. This concentrate, having a protein content of 2.9%, is then subjected to gel filtration (Sephadex G-25). 200 litres of primary elution fraction containing 2.4% protein are collected. This elution fraction is then acidified to pH 4.5 with citric acid and treated as described in Example 1.

After final drying 4.6 kg of powdered product are obtained, containing 70% of protein. It has a neutral odour and taste, and is soluble in water at any pH.

EXAMPLE 5

35 kg of peanut oil and 0.2 kg of lecithin are emulsified at 45°C in 100 litres of an aqueous solution containing 6.5 kg of the product obtained in Example 3. This emulsion is then homogenised in 2 stages in a Manton Gaulin homogeniser, at respective pressures of 250 and 50 kg/cm$^2$, and spray-dried. The resulting powdered product, exempt from off odours, disperses very easily in water and forms, on dispersion in aqueous media, a milky suspension which is stable at a pH below 3.4. This product may be used as a clouding agent for beverages, in particular acidified protein-enriched beverages of the type in which usual clouding agents, containing polysaccharides, would react with the proteins to form insoluble complexes.

EXAMPLE 6

A powdered blend is prepared containing 17 kg of the product obtained in Example 2, 50 kg of sucrose, 6 kg of citric acid, 3 kg of the clouding agent prepared in Example 5, 0.1 kg of pectin, 0.2 kg of ascorbic acid, 37 g orange flavour ("Tetrarome Orange", produced by Firmenich Company, Geneva, Switzerland) 20 g FDC No 5 orange colouring and 4 g FDC No 6 yellow colouring.

A powdered composition is thus obtained, which on dispersion in cold water, at a level of 16 g composition per 100 ml of water, provides a beverage similar in taste and appearance to orange juice and containing 2% of protein of high nutritive value.

We claim:

1. A process for preparing a soluble whey protein fraction which comprises adjusting the pH of an aqueous solution isolated from whey by subjecting a whey fraction to ultrafiltration, molecular sieve filtration or a combination thereof, said solution containing proteins which are substantially undenatured by heat, to a value of 4.4 to 5.0 to form a precipitate, removing the precipitate, separating lipid/protein complexes from the remaining solution by microfiltration with a filter having a filtration threshhold of about 1 micron or less and recovering the filtrate containing a soluble whey protein fraction in solution.

2. A process according to claim 1, in which after removal of the precipitate the pH of the solution is adjusted to a value of not exceeding 3.4 and the solution is sterilised.

3. A process according to claim 1 in which the soluble protein fraction contained in the filtrate is emulsified in aqueous solution with a vegetable fat and the emulsion is spray-dried.

4. A process according to claim 3 in which the emulsion is homogenized before spray-drying.

5. A process according to claim 1 in which the microfiltration is effected with a filter having a filtration threshhold of about 1 micron.

6. A process for preparing a soluble whey protein fraction which comprises adjusting the pH of an aqueous solution obtained by dispersing in water a protein concentrate or isolate obtained from whey by ultrafiltration, molecular sieve filtration, or a combination thereof, said solution containing proteins which are substantially undenatured by heat, to a value of 4.4 to 5.0 to form a precipitate, removing the precipitate, separating lipid/protein complexes from the remaining solution by microfiltration with a filter having a filtration threshhold of about 1 micron or less and recovering the filtrate containing a soluble whey protein fraction in solution.

7. A process according to claim 6, in which after removal of the precipitate the pH of the solution is adjusted to a value not exceeding 3.4 and the solution is sterilized.

8. A process according to claim 6, in which the soluble protein fraction contained in the filtrate is emulsified in aqueous solution with a vegetable fat and the emulsion is spray dried.

9. A process according to claim 8, in which the emulsion is homogenized before spray drying.

10. A process according to claim 6 in which the microfiltration is effected with a filter having a filtration threshhold of about 0.5 micron.

* * * * *